United States Patent
Takeuchi et al.

(10) Patent No.: US 6,803,147 B2
(45) Date of Patent: Oct. 12, 2004

(54) SILVER VANADIUM OXIDE HAVING LOW INTERNAL RESISTANCE AND METHOD OF MANUFACTURE

(75) Inventors: Esther S. Takeuchi, East Amherst, NY (US); Marcus Palazzo, North Tonawanda, NY (US)

(73) Assignee: Wilson Greatbatch Technologies, Inc., Clarence, NY (US)

(*) Notice: Subject to any disclaimer, the term of this patent is extended or adjusted under 35 U.S.C. 154(b) by 154 days.

(21) Appl. No.: 10/037,133

(22) Filed: Dec. 27, 2001

(65) Prior Publication Data

US 2002/0086209 A1 Jul. 4, 2002

Related U.S. Application Data

(60) Provisional application No. 60/259,068, filed on Dec. 28, 2000.

(51) Int. Cl.$^7$ .................................................. H01M 4/54
(52) U.S. Cl. ................. 429/219; 429/218.1; 429/231.2; 423/62; 423/594.8
(58) Field of Search .......................... 429/218.1, 231.2, 429/219; 423/62, 594.8

(56) References Cited

U.S. PATENT DOCUMENTS

| | | | |
|---|---|---|---|
| 4,310,609 A | | 1/1982 | Liang et al. |
| 4,965,151 A | | 10/1990 | Takada et al. |
| 5,194,342 A | * | 3/1993 | Bito et al. ............... 429/304 |
| 5,221,453 A | * | 6/1993 | Crespi ..................... 204/291 |
| 5,389,472 A | | 2/1995 | Takeuchi et al. |
| 5,545,497 A | | 8/1996 | Takeuchi et al. |
| 6,093,506 A | | 7/2000 | Crespi et al. |
| 6,130,005 A | | 10/2000 | Crespi et al. |
| 6,171,729 B1 | | 1/2001 | Gan et al. |
| 6,180,283 B1 | | 1/2001 | Gan et al. |
| 6,225,007 B1 | * | 5/2001 | Horne et al. ............. 429/231.5 |

FOREIGN PATENT DOCUMENTS

| | | | | |
|---|---|---|---|---|
| EP | 0 478 303 A2 | 4/1992 | | |
| EP | 0 638 946 A2 | 2/1994 | | |
| EP | 0 849 225 A1 | 6/1998 | | |
| EP | 0 856 490 A1 | 8/1998 | | |
| EP | 1 058 326 A2 | 12/2000 | | |
| JP | 03093628 A | * | 4/1991 | ........... C01G/31/00 |

OTHER PUBLICATIONS

Solid–State Syntheses and Characterization of Silver Vanadium Oxide for Use as a Cathode Material for Lithium Batteries–Randolph A. Leising and Esther S. Takeuchi–Chemistry of Materials, 1994, 6.

* cited by examiner

*Primary Examiner*—Carol Chaney
(74) *Attorney, Agent, or Firm*—Michael F. Scalise

(57) ABSTRACT

The current invention relates to the preparation of an improved cathode active material for non-aqueous lithium electrochemical cell. In particular, the cathode active material comprises $\epsilon$-phase silver vanadium oxide prepared by using a $\gamma$-phase silver vanadium oxide starting material. The reaction of $\gamma$-phase SVO with a silver salt produces the novel $\epsilon$-phase SVO possessing a lower surface area than $\epsilon$-phase SVO produced from vanadium oxide ($V_2O_5$) and a similar silver salt as starting materials. Consequently, the low surface area $\epsilon$-phase SVO material provides an advantage in greater long term stability in pulse dischargeable cells.

18 Claims, 10 Drawing Sheets

SILVER VANADIUM OXIDE HAVING LOW INTERNAL RESISTANCE AND METHOD OF MANUFACTURE

CROSS REFERENCE TO RELATED APPLICATION

This application claims priority based on provisional application Ser. No. 60/259,068, filed Dec. 28, 2000.

BACKGROUND OF THE INVENTION

1. Field of the Invention

This invention relates to the conversion of chemical energy to electrical energy. More particularly, this invention relates to the preparation of an improved cathode active material for non-aqueous lithium electrochemical cells, and still more particularly, a reaction product of γ-phase silver vanadium oxide ($Ag_{0.8}V_2O_{5.4}$), ε-phase silver vanadium oxide (SVO, $Ag_2V_4O_{11}$) and silver metal. This active product is the result of a synthesis technique including a silver-containing material and a vanadium-containing material having a silver to vanadium mole ratio of 1:2 and reacted under an atmosphere of reduced oxygen. The resulting mixed phase active material incorporated into a lithium cell provides a cathode electrode of decreased resistance and, hence, improved rate capability in comparison to cathodes of a single phase SVO material. The product cathode active material is useful in an implantable electrochemical cell, for example of the type powering a cardiac defibrillator, where the cell may run under a light load for significant periods interrupted from time to time by high rate pulse discharge.

2. Prior Art

Silver vanadium oxide (SVO) is normally prepared by heating appropriate amounts of a silver-containing compound with a vanadium oxide under static conditions in the presence of air. Such a decomposition reaction is described in U.S. Pat. Nos. 4,310,609 and 4,391,729, both to Liang et al., which are assigned to the assignee of the present invention and incorporated herein by reference. The decomposition reaction occurs under an air atmosphere at a temperature of about 360° C. Specifically, Liang et al. discloses the preparation of silver vanadium oxide by a thermal decomposition reaction of silver nitrate with vanadium oxide conducted under an air atmosphere to produce ε-phase silver vanadium oxide having the formula $Ag_2V_4O_{11}$.

A decomposition reaction is further detailed in the publication: Leising, R. A.; Takeuchi, E. S. *Chem. Mater.* 1993, 5, 738–742, where the synthesis of SVO from silver nitrate and vanadium oxide under an air atmosphere is presented as a function of temperature. In another reference: Leising, R. A.; Takeuchi, E. S. *Chem. Mater.* 1994, 6, 489–495, the synthesis of SVO from different silver precursor materials (silver nitrate, silver nitrite, silver oxide, silver vanadate, and silver carbonate) is described. The product active materials of this latter publication are consistent with the formation of a mixture of SVO phases prepared under argon, which is not solely ε-phase $Ag_2V_4O_{11}$.

Also, the preparation of SVO from silver oxide and vanadium oxide is well documented in the literature. In the publications: Fleury, P.; Kohlmuller, R. C. R. *Acad. Sci. Paris* 1966, 262C, 475–477, and Casalot, A.; Pouchard, M. *Bull Soc. Chim. Fr.* 1967, 3817–3820, the reaction of silver oxide with vanadium oxide is described. Wenda, E. *J. Thermal Anal.* 1985, 30, 89–887, present the phase diagram of the $V_2O_5$-$Ag_2O$ system in which the starting materials are heated under oxygen to form SVO, among other materials.

Thus, Fleury and Kohlmuller teach that the heat treatment of silver- and vanadium-containing starting materials under a non-oxidizing atmosphere (such as argon) results in the formation of SVO with a reduced silver content.

The prior art further describes conducting a decomposition reaction with a lower percentage of a silver-containing compound in the presence of vanadium pentoxide, resulting in the formation of a silver deficient γ-phase silver vanadium oxide ($Ag_{0.74}V_2O_{5.37}$) along with β-phase SVO ($Ag_{0.35}V_2O_{5.18}$) This is described in U.S. Pat. No. 5,545,497 to Takeuchi et al. In addition, U.S. Pat. No. 6,171,729 to Gan et al. shows exemplary alkali metal/solid cathode electrochemical cells in which the cathode may be an SVO of β-, γ- or ε-phase materials.

It should be pointed out that various references list γ-phase SVO as $Ag_{0.74}V_2O_{5.37}$ or $Ag_{0.8}V_2O_{5.4}$, however, they are essentially the same. For example, V. L. Volkov, A. A. Fotiev, N. G. Sharova, L. L. Surat, Russ. J. Ignore. Chem. 21 (1976) 1566 list γ-phase SVO as $Ag_{0.74}V_2O_{5.37}$. Other references list this material as $Ag_{0.8}V_2O_{5.4}$ and the two formulations for γ-phase SVO are equivalents for the purpose of this invention.

However, none of the prior art methods is capable of producing a low resistance cathode material as a combination of γ-phase silver vanadium oxide ($Ag_{0.8}V_2O_{5.4}$), ε-phase silver vanadium oxide (SVO, $Ag_2V_4O_{11}$) and silver metal, as per the current invention. Therefore, based on the prior art, there is a need to develop a process for the synthesis of a mixed phase metal oxide including silver vanadium oxide and silver metal and having a relatively low resistance. The product is a cathode active material useful for non-aqueous electrochemical cells having enhanced discharge characteristics, including the high pulse capability necessary for use with cardiac defibrillators.

SUMMARY OF THE INVENTION

The current invention relates to the preparation of an improved cathode active material for non-aqueous lithium electrochemical cells, and in particular, one containing γ-phase SVO and ε-phase SVO as well as elemental silver. The reaction product possess a relatively resistance (Rdc) in comparison to SVO prepared by prior art techniques. The present synthesis technique is not, however, limited to silver salts since salts of copper, magnesium and manganese can be used to produce relatively low resistance active materials as well.

These and other aspects of the present invention will become increasingly more apparent to those of ordinary skill in the art by reference to the following description taken in conjunction with the accompanying drawings.

DETAILED DESCRIPTION OF THE PREFERRED EMBODIMENTS

Figure 1:
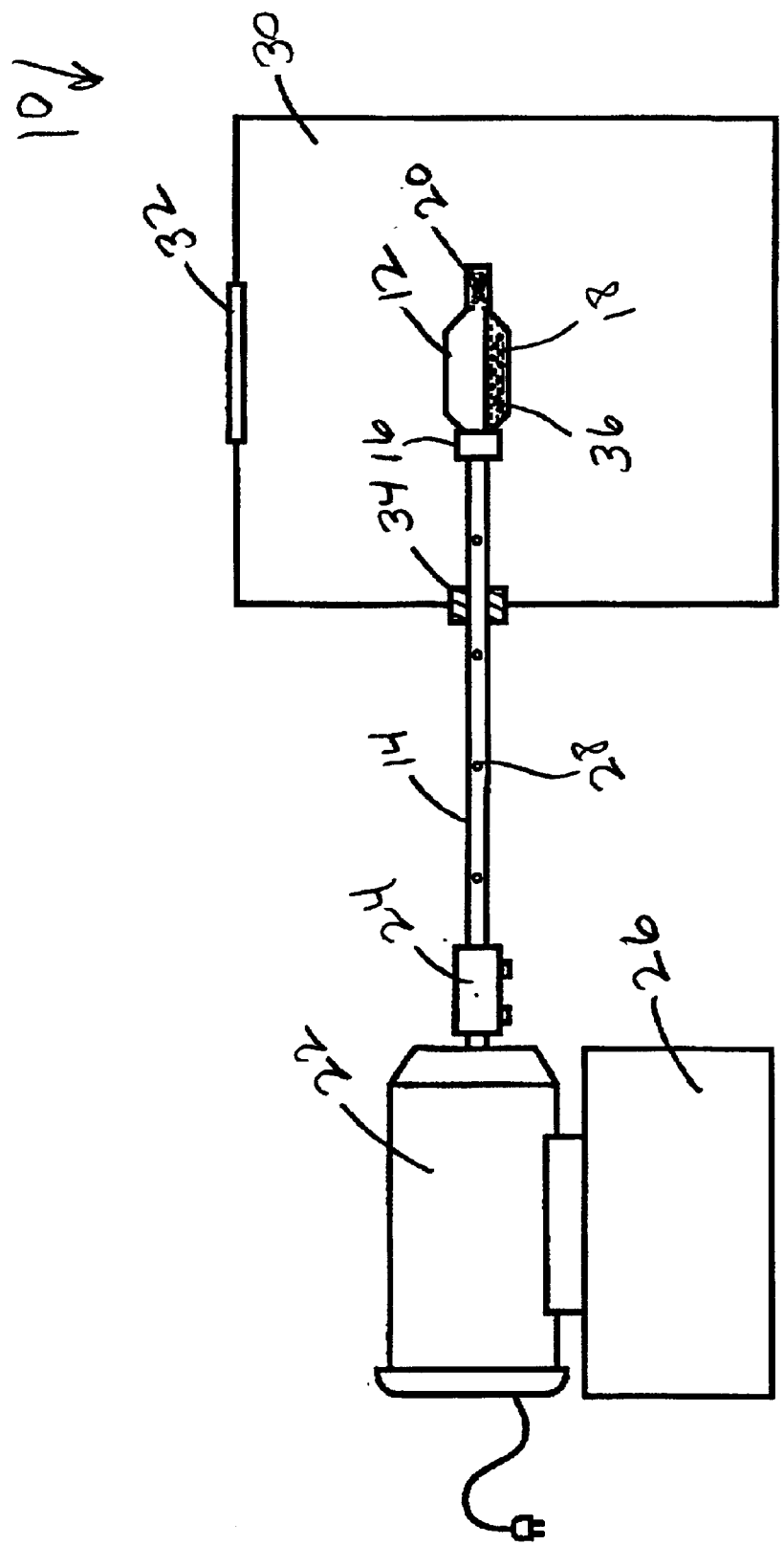
FIG. 1 is a schematic view of an exemplary reactor assembly according to the present invention.

The thermal reaction of silver nitrate with vanadium oxide under an air atmosphere is a typical example of the preparation of ε-phase silver vanadium oxide by a decomposition reaction. This reaction is set forth below in Equation 1:

$$2AgNO_3 + 2V_2O_5 \rightarrow Ag_2V_4O_{11} + 2NO_x \quad (1)$$

The physical characteristics of SVO material (i.e. particle morphology, surface area, crystallinity, etc.) produced by this reaction are dependent on the temperature and time of reaction. In addition, the reaction environment has a dramatic effect on the product material. The same reaction of silver nitrate with vanadium oxide conducted under an argon atmosphere produces a γ-phase silver vanadium oxide, as depicted below in Equation 2:

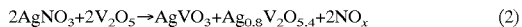

$$2AgNO_3 + 2V_2O_5 \rightarrow AgVO_3 + Ag_{0.8}V_2O_{5.4} + 2NO_x \quad (2)$$

Thus, the synthesis of SVO under an inert atmosphere results in the formation of a mixture of silver vanadate ($AgVO_3$) and γ-phase SVO ($Ag_{0.8}V_2O_{5.4}$)This is described in the above-referenced publication by Leising, R. A.; Takeuchi, E. S. Chem. Mater. 1994, 6, 489–495.

In contrast, the current invention discloses that reacting a silver-containing material with a vanadium-containing material in a reduced oxygen atmosphere produces a mixed silver vanadium oxide active material. Suitable silver-containing starting materials include silver nitrate ($AgNO_3$), silver carbonate ($Ag_2CO_3$), silver lactate ($AgC_3H_5O_3$), silver triflate ($AgCF_3SO_3$), silver pentafluoropropionate ($AgC_3F_5O_2$), silver laurate ($AgC_{12}H_{23}O_2$), silver myristate ($AgC_{14}H_{27}O_2$), silver palmitate ($AgC_{16}H_{31}O_2$), silver stearate ($AgC_{18}H_{35}O_2$), silver vanadate ($AgVO_5$), silver oxide ($Ag_2O$) and combinations and mixtures thereof. Suitable vanadium-containing compounds include $NH_4VO_3$, $AgVO_2$, $V_2O_5$, $V_2O_4$, $V_6O_{13}$, $V_2O_3$, and mixtures thereof. Preferably, the silver-containing compound is in a 1:2 mole ratio with the vanadium-containing compound.

The synthesis is conducted by heating the reactants in a reduced oxygen atmosphere from a temperature of about 200° C. to about 550° C. A more preferred heating protocol comprises a first heating at a relatively low temperature, followed by a re-mixing then a second heating regime at a series of stepped temperatures, then another grinding step, and a final heating at a temperature above the last heating of the stepped temperatures. For example, after thoroughly mixing silver nitrate and vanadium oxide, they are first heated to about 220° C. for about 5 hours. The intermediate product is then ground at ambient prior to re-heating at about 230° C. for about 30 minutes, then at about 260° C. for about 2 hours, and finally at about 300° C. for about 15 hours. The resulting material is again re-ground at ambient prior to a final heating at about 500° C. for about 30 hours. The exact heating protocol depends on the specific starting materials.

Heating times for any of the first, second and final heating steps range from about 30 minutes to about 30 hours. Longer heating times are required for lower heating temperatures. Also, while the present invention is described as requiring three heating events with intermediate ambient mixing, that is not necessarily imperative. Some synthesis protocols according to the present invention may require one heating step with periodic mixing, or multiple heating events with periodic ambient mixing. Furthermore, mixing at the heating temperature can be done in addition to the ambient mixing, or in lieu of it.

A reduced oxygen atmosphere is defined as one that has a oxygen content ranging from about 1.0% to about 10.0%. A more preferred range is about 1.3% to about 5.0%. The product material possesses a relatively low internal resistance in comparison to SVO active material synthesized by a thermal decomposition reaction under an oxidizing atmosphere.

FIG. 1 shows an exemplary reactor assembly 10 for conducting a synthesis according to the present invention. The reactor assembly includes a stainless steel reaction chamber 12 connected to a hollow stainless steel conduit 14 by a coupling 16. The reaction chamber 12 is a container of sufficient volume to house a quantity of reactants 18 comprising a silver-containing material and a vanadium-containing material in a 1:2 mole ratio needed to produce a sufficient quantity of cathode active material to build a desired number of electochemical cells. The chamber 12 has opposed open ends, one to which the conduit 14 is connected, the other supporting a glass wool plug 20. The opposite end of the conduit 14 is connected to an electric motor 22 by a coupling 24. The motor is supported on a base 26. The conduit 14 is provided with a plurality of openings 28 through its side wall that serve to provide ambient air to the reaction chamber 12. The chamber 12 and a portion of the conduit 14 are housed inside an oven 30 provided with a vent 32. The conduit 14 is supported in the side wall of the oven 30 by a bearing 34 so that the motor 22 can impart rotational movement to the conduit and chamber. Finally, a plurality of stainless steel ball bearings 36 are provided in the chamber 12 along with the reactants 18.

The purpose of the plug 20 is to prevent the free flow of ambient air through the chamber 12, and in that manner provide a reduced oxygen atmosphere therein. For example, when the reactants are silver carbonate and vanadium oxide, the former material will give off $CO_2$ as it reacts. This will displace oxygen while the plug 20 prevents the free flow of ambient air into and through the chamber 12.

Depending on the reactants, the product cathode active material has about 30% to about 70% γ-phase SVO, about 30% to about 70% ε-phase SVO and about 1% to about 15% silver metal.

The product cathode active material provides an electrochemical cell that possesses sufficient energy density and discharge capacity required to meet the vigorous requirements of implantable medical devices. These types of cells comprise an anode of a metal selected from Groups IA, IIA and IIIB of the Periodic Table of the Elements. Such anode active materials include lithium, sodium, potassium, etc., and their alloys and intermetallic compounds including, for example, Li—Mg, Li—Si, Li—Al, Li—B and Li—Si—B alloys and intermetallic compounds. The preferred anode comprises lithium. An alternate anode comprises a lithium alloy such as a lithium-aluminum alloy. The greater the amount of aluminum present by weight in the alloy, however, the lower the energy density of the cell.

The form of the anode may vary, but preferably the anode is a thin metal sheet or foil of the anode metal, pressed or rolled on a metallic anode current collector, i.e., preferably comprising titanium, titanium alloy or nickel, to form an anode component. Copper, tungsten and tantalum are also suitable materials for the anode current collector. In the exemplary cell of the present invention, the anode component has an extended tab or lead of the same material as the anode current collector, i.e., preferably nickel or titanium, integrally formed therewith such as by welding and contacted by a weld to a cell case of conductive metal in a case-negative electrical configuration. Alternatively, the anode may be formed in some other geometry, such as a bobbin shape, cylinder or pellet to allow an alternate low surface cell design.

Before the previously described cathode active material comprising γ-phase SVO, ε-phase SVO and silver metal is fabrication into a cathode electrode for incorporation into an electrochemical cell, they are preferably mixed with a binder material, such as a powdered fluoro-polymer, more preferably powdered polytetrafluoroethylene (PTFE) or powdered polyvinylidene fluoride, present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as of nickel, aluminum, titanium and stainless steel. The preferred cathode active mixture thus includes a powdered fluoro-polymer binder present at about 3 weight percent, a conductive diluent present at about 3 weight percent and about 94 weight percent of the cathode active material. For example, depending on the application of the electrochemical cell, the range of cathode compositions is from about 99% to about 80%, by weight, of the present cathode active material comprising γ-phase SVO, ε-phase SVO and silver metal mixed with carbon graphite and PTFE.

Cathode components for incorporation into an electrochemical cell according to the present invention may be prepared by rolling, spreading or pressing the cathode active materials onto a suitable current collector selected from the group consisting of stainless steel, titanium, tantalum, platinum, gold, aluminum, cobalt-nickel alloys, nickel-containing alloys, highly alloyed ferritic stainless steel containing molybdenum and chromium, and nickel-, chromium- and molybdenum-containing alloys. The preferred current collector material is titanium and, most preferably, the titanium cathode current collector has a thin layer of graphite/carbon material, iridium, iridium oxide or platinum applied thereto. Cathodes prepared as described above may be in the form of one or more plates operatively associated with at least one or more plates of anode material, or in the form of a strip wound with a corresponding strip of anode material in a structure similar to a "jellyroll".

In order to prevent internal short circuit conditions, the cathode is separated from the Group IA, IIA or IIIB anode by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow there through of the electrolyte during the electrochemical reaction of the cell. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C. H. Dexter, Div., Dexter Corp.).

The electrochemical cell of the present invention further includes a nonaqueous, ionically conductive electrolyte which serves as a medium for migration of ions between the anode and the cathode electrodes during the electrochemical reactions of the cell. The electrochemical reaction at the electrodes involves conversion of ions in atomic or molecular forms which migrate from the anode to the cathode. Thus, nonaqueous electrolytes suitable for the present invention are substantially inert to the anode and cathode materials, and they exhibit those physical properties necessary for ionic transport, namely, low viscosity, low surface tension and wettability.

A suitable electrolyte has an inorganic, ionically conductive salt dissolved in a nonaqueous solvent, and more preferably, the electrolyte includes an ionizable alkali metal salt dissolved in a mixture of aprotic organic solvents comprising a low viscosity solvent and a high permittivity solvent. The inorganic, tonically conductive salt serves as the vehicle for migration of the anode ions to intercalate or react with the cathode active material. Preferably, the ion forming alkali metal salt is similar to the alkali metal comprising the anode.

In the case of an anode comprising lithium, the alkali metal salt of the electrolyte is a lithium based salt. Known lithium salts that are useful as a vehicle for transport of alkali metal ions from the anode to the cathode include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

Low viscosity solvents useful with the present invention include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy, 2-methoxyethane (EME), ethyl methyl carbonate, methyl propyl carbonate, ethyl propyl carbonate, diethyl carbonate, dipropyl carbonate, and mixtures thereof. Suitable high permittivity solvents include cyclic carbonates, cyclic esters and cyclic amides such as propylene carbonate (PC), ethylene carbonate (EC), butylene carbonate (BC), acetonitrile, dimethyl sulfoxide, dimethyl, formamide, dimethyl acetamide, γ-valerolactone, γ-butyrolactone (GBL), N-methyl-pyrrolidinone (NMP), and mixtures thereof. In the present invention, the preferred anode is lithium metal and the preferred electrolyte is 0.8M to 1.5M $LiAsF_6$ or $LiPF_6$ dissolved in a 50:50 mixture, by volume, of propylene carbonate as the preferred high permittivity solvent and 1,2-dimethoxyethane as the preferred low viscosity solvent.

The preferred form of a primary alkali metal/solid cathode electrochemical cell is a case-negative design wherein the anode is in contact with a conductive metal casing and the cathode contacted to a current collector is the positive terminal. The cathode current collector is in contact with a positive terminal pin via a lead of the same material as the current collector. The lead is welded to both the current collector and the positive terminal pin for electrical contact.

A preferred material for the casing is titanium although stainless steel, mild steel, nickel-plated mild steel and aluminum are also suitable. The casing header comprises a metallic lid having an opening to accommodate the glass-to-metal seal/terminal pin feedthrough for the cathode electrode. The anode electrode is preferably connected to the case or the lid. An additional opening is provided for electrolyte filling. The casing header comprises elements having compatibility with the other components of the electrochemical cell and is resistant to corrosion. The cell is thereafter filled with the electrolyte solution described hereinabove and hermetically sealed such as by close-welding a titanium plug over the fill hole, but not limited thereto. The cell of the present invention can also be constructed in a case-positive design.

The following examples describe the manner and process of an electrochemical cell according to the present invention, and they set forth the best mode contemplated by the inventors of carrying out the invention, but they are not to be construed as limiting.

EXAMPLE 1

A 1:2 molar ratio of silver nitrate ($AgNO_3$):vanadium oxide ($V_2O_5$) was mixed and heated in ambient air to about 220° C. for about 5 hours. The intermediate product was ground with a mortar and pestle prior to re-heating in ambient air at about 230° C. for about 30 minutes, then at about 260° C. for about 2 hours, and finally at about 300° C. for about 15 hours. The product was again re-ground prior to heating in ambient air at about 500° C. for about 30 hours.

EXAMPLE 2

A 1:2 molar ratio of silver carbonate ($Ag_2CO_3$):vanadium oxide was milled for about 5 minutes using a Spex 8000 mill. The mixture was then placed in a beaker and heated in a muffle furnace under a flow of air. A ramp rate of about 20° C./minute to about 500° C. was used for a total of about 9 hours.

EXAMPLE 3

A 1:2 molar ratio of silver carbonate:vanadium oxide was milled for about 5 minutes using a Spex 8000 mill. The mixture was then placed in a 10 cc stainless steel Swagelok sample cylinder with three 6 mm stainless steel bearings. This reaction chamber was partially sealed with glass wool plugs and connected to a hollow stainless steel rod containing holes for air flow. The rod/chamber assembly was then rotated inside a muffle furnace at about 210 rpm using an external electric motor for about 20 hours. At the start of rotation, the furnace was heated at about 20° C./minutes to about 500° C. for about 9 hours. The reaction atmosphere was about 94% $CO_2$/6% air.

Cathode Preparation

Three electrochemical cells were built, each having a cathode comprising a binder slurry of, by weight, 4% polyamic acid/1% PVDF in NMP prepared at a concentration of about 8% solids. The slurry was mixed at low shear for about 15 minutes. A powder mixture consisting essentially of, by weight, 91% SVO from the respective Examples 1 to 3 and about 5% carbonaceous diluent was dry milled to a homogeneous mixture. The milled solids were then added to the previously mixed binder slurry with a second low shear mixing step for about 10 minutes. The resulting cathode slurry was coated onto an aluminum current collector foil using a doctor blade. Upon drying, the cathode was cured according to the following heating protocol: about 140° C. for about 30 minutes, then about 200° C. for about 30 minutes, and finally about 350° C. for about one hour.

Electrochemical Testing of Cells 1 to 3

Test Cells 1, 2 and 3 according to Examples 1 to 3 were assembled using a punched cathode of the respective SVO materials contacted to an aluminum current collector foil. The cathodes were electrically associated with an lithium metal anode (nickel current collector screen) to give an active area of approximately 2 $cm^2$ for each cell. Each test cell was activated with an electrolyte of 1M $LiAsF_6$ dissolved in PC/DME=1:1.

Figure 2:
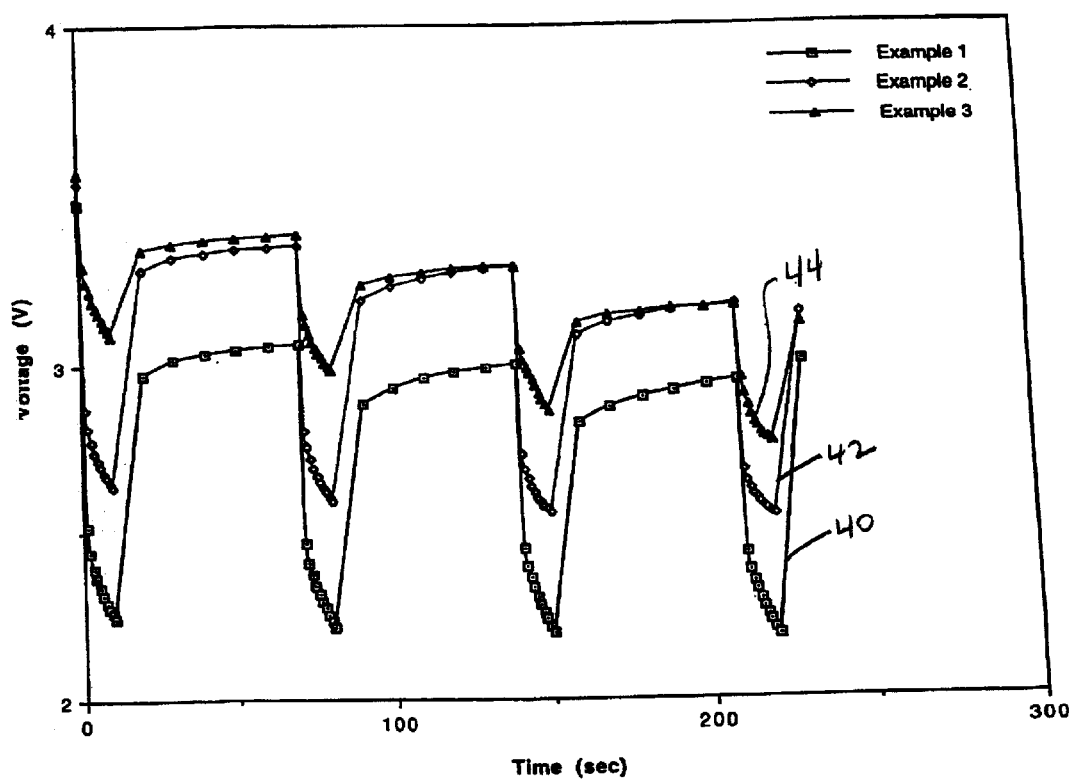
FIG. 2 is a graph constructed from the pulse discharge of a two Li/SVO test cells according to the prior art in comparison to one according to the present invention.

Test Cells 1, 2 and 3 were discharged using a series of four 1,200 mA/cc cathode volume for a duration of 10 seconds, the pulses being separated from each other by 15 seconds. The data from one train of this pulse discharge protocol was used to construct the graph of FIG. 2. In particular, curves 40, 42 and 44 were constructed from respective Test Cells 1 to 3. As shown, Test Cell 3 assembled with a cathode having SVO synthesized with the rotation treatment had the least amount of dc resistance.

Test Cells 1 to 3 were then discharged using a series of four 300 mA/g SVO pulses for a duration of 10 seconds. The cells were rested at open circuit voltage for 30 minutes after each pulse train of four pulses, the pulses being separated from each other by 15 seconds. This pulsing protocol was repeated until cell voltage reached 1.0 V.

Figure 3:
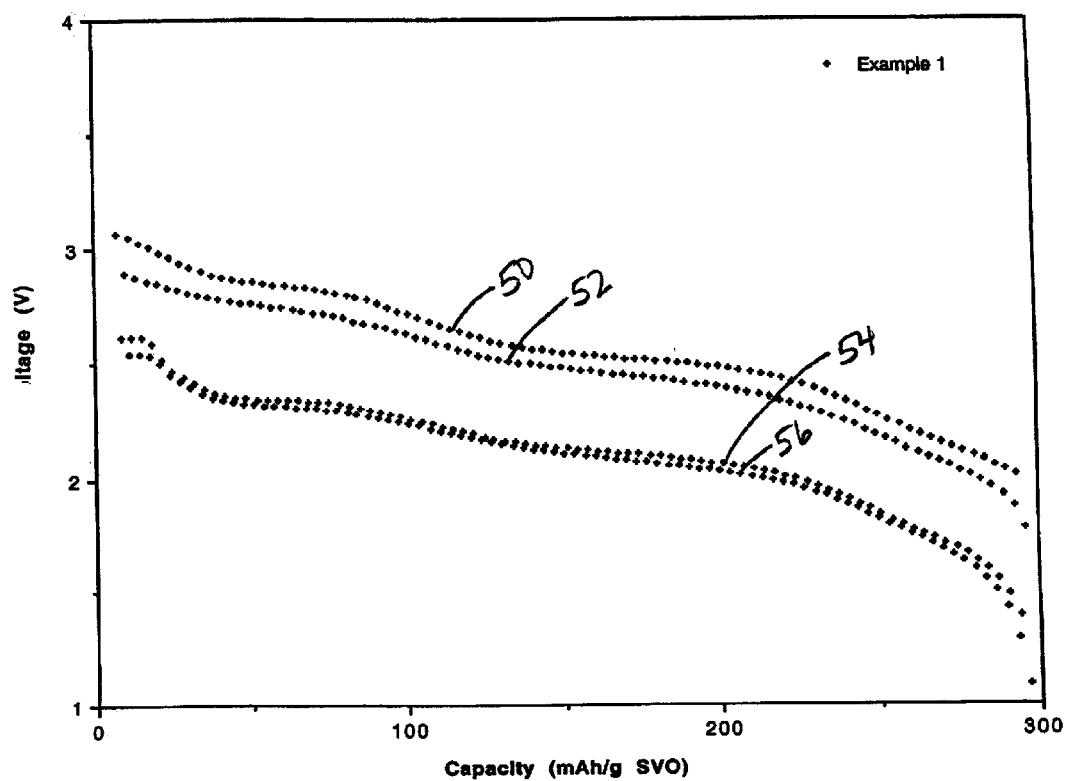
FIGS. 3 and 4 are graphs constructed from the pulse discharge of the prior art Li/SVO cells used to construct FIG. 2.
Figure 4:
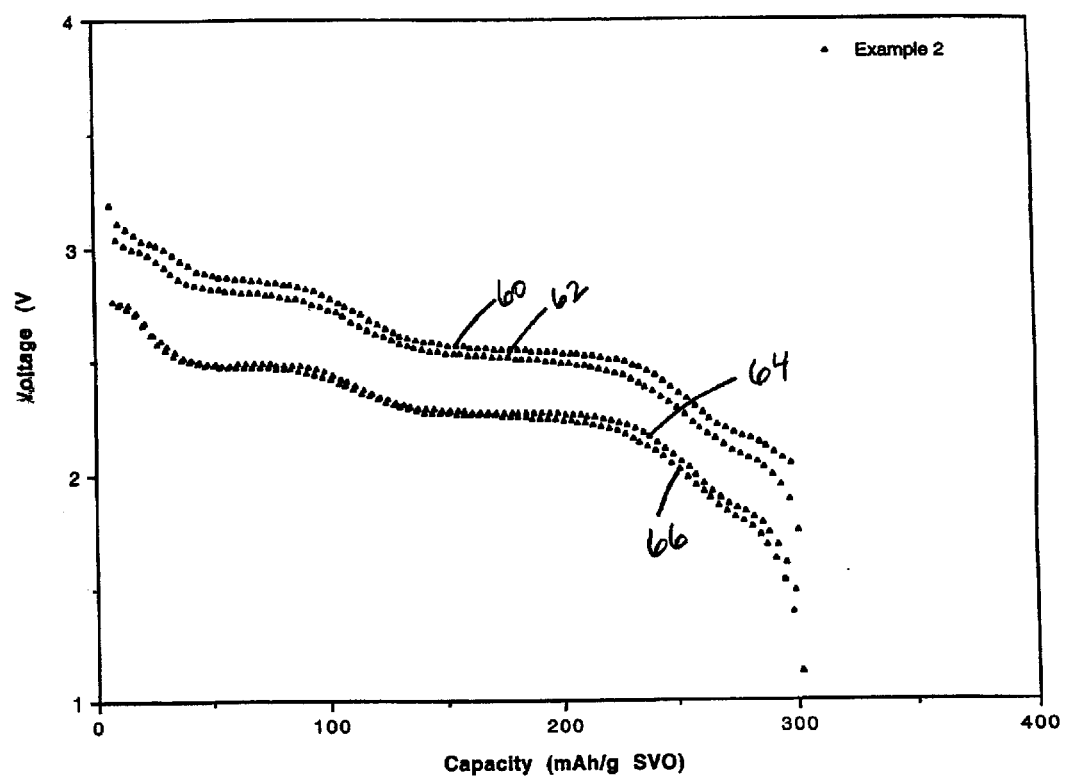

Results of the 300 mA/g SVO pulse discharge are presented in the graphs of FIGS. 3 to 7. In FIG. 3, curve 50 is the prepulse voltage before pulse 1, curve 52 is the prepulse voltage before pulse 4, curve 54 is the pulse 1 minima voltage and curve 56 is the pulse 4 minima voltage. In FIG. 4, respective curves 60, 62, 64 and 66 are those for the discharge of Test Cell 2 and, in FIG. 5, respective curves 70, 72, 74 and 76 are those for the discharge of Test Cell 3.

Figure 5:
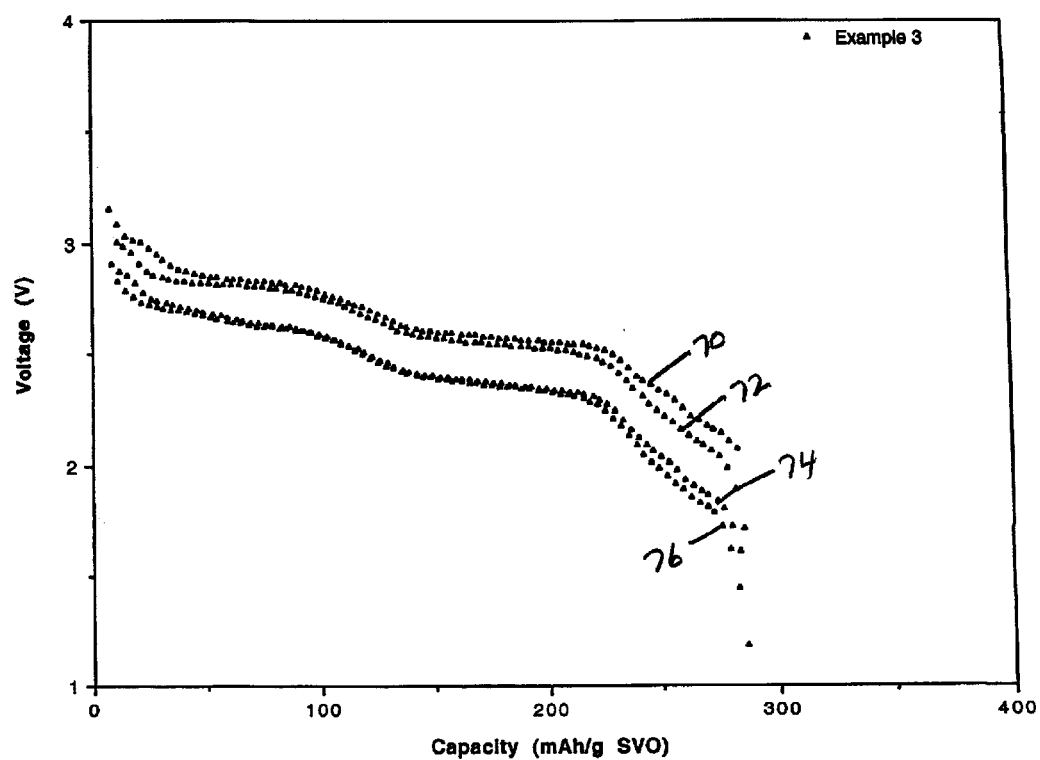
FIG. 5 is a graph of the pulse discharge of the present invention LI/SVO cell used to construction FIG. 2.
Figure 6:
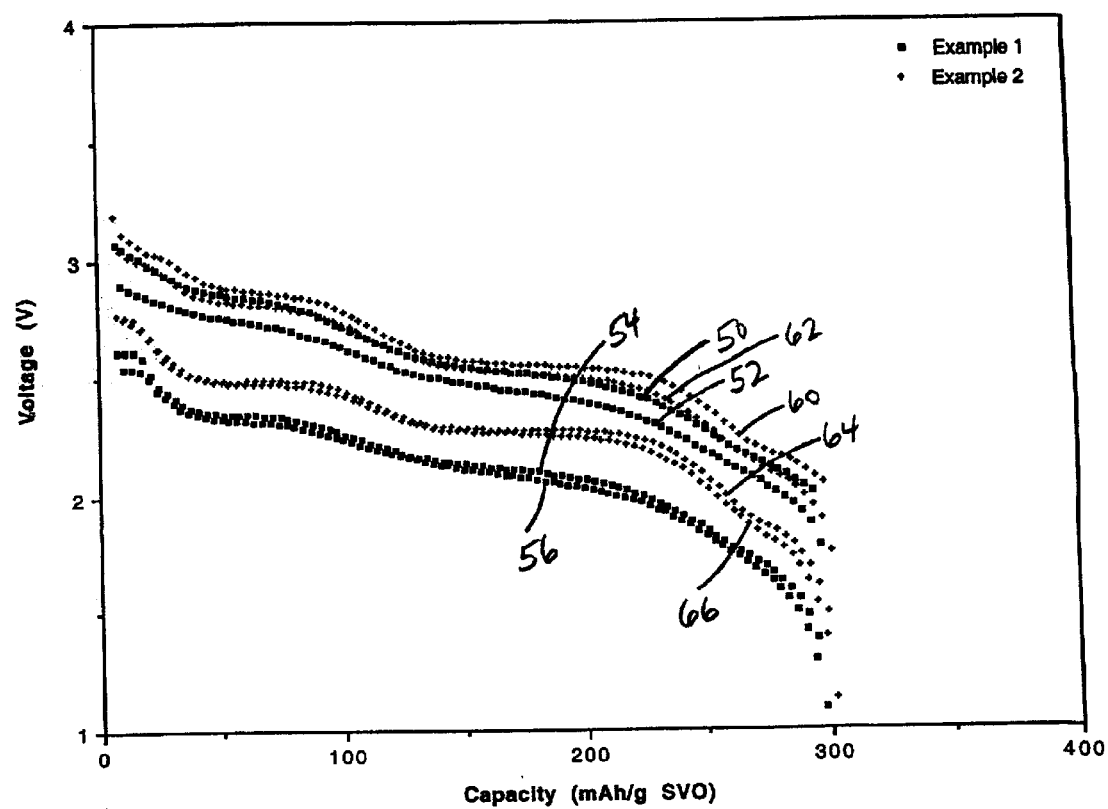
FIG. 6 is an overlay graph of the cells used to construct FIGS. 3 and 4.
Figure 7:
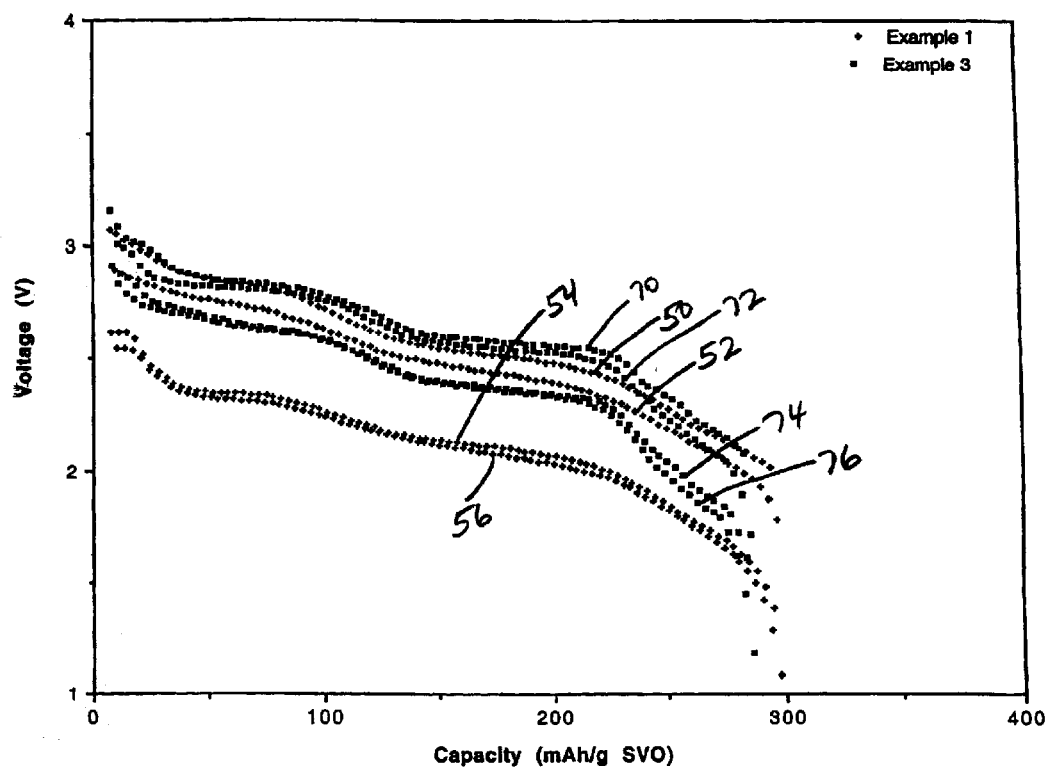
FIG. 7 is an overlay graph of the cells used to construct FIGS. 3 and 5.

FIG. 5 overlays the discharge data presented in FIGS. 3 and 4 for the SVO material of Test Cells 1 and 2 (Examples 1 and 2). Similarly, FIG. 6 overlays the discharge data presented in FIGS. 3 and 5 for the SVO material of Test Cells 1 and 3 (Examples 1 and 3). Again, the largest improvement in cell resistance is for that of Test Cell 3 (Example 3), which included the SVO synthesized under the rotation treatment. Thus, lithium cells made with this SVO material display improved performance toward rate capability.

Additional experiments were performed to further investigate resistance characteristics of SVO produced in a reaction chamber having reduced air atmosphere. These include synthesizing SVO in a tube furnace under a reduced air atmosphere using a carbon dioxide/air mixture. A test was also done to discharge the SVO to measure degree of product crystallinity.

EXAMPLE 4

A 1:1 molar ratio of silver nitrate:vanadium oxide was mixed and heated in ambient air to about 220° C. for about 5 hours. The intermediate product was ground with a mortar and pestle prior to re-heating in ambient air at about 230° C. for about 30 minutes, then at about 260° C. for about 2 hours, and finally at about 300° C. for about 15 hours. The product was again re-ground prior to heating in ambient air at about 500° C. for about 30 hours.

EXAMPLE 5

A 1:2 molar ratio of silver carbonate:vanadium oxide was milled for about 5 minutes using a Spex 8000 mill. The mixture was then placed in an aluminum pan and heated in a tube furnace under a flow of carbon dioxide and air (about 94% $CO_2$/6% air). A ramp rate of about 20° C./minute to about 500° C. was used for a total of about 9 hours.

Test Cells 4 and 5 and Testing

Test Cells 4 and 5 containing the respective SVO materials of Examples 4 and 5 were assembled in an identical manner as Test Cells 1 to 3 described above.

Figure 8:
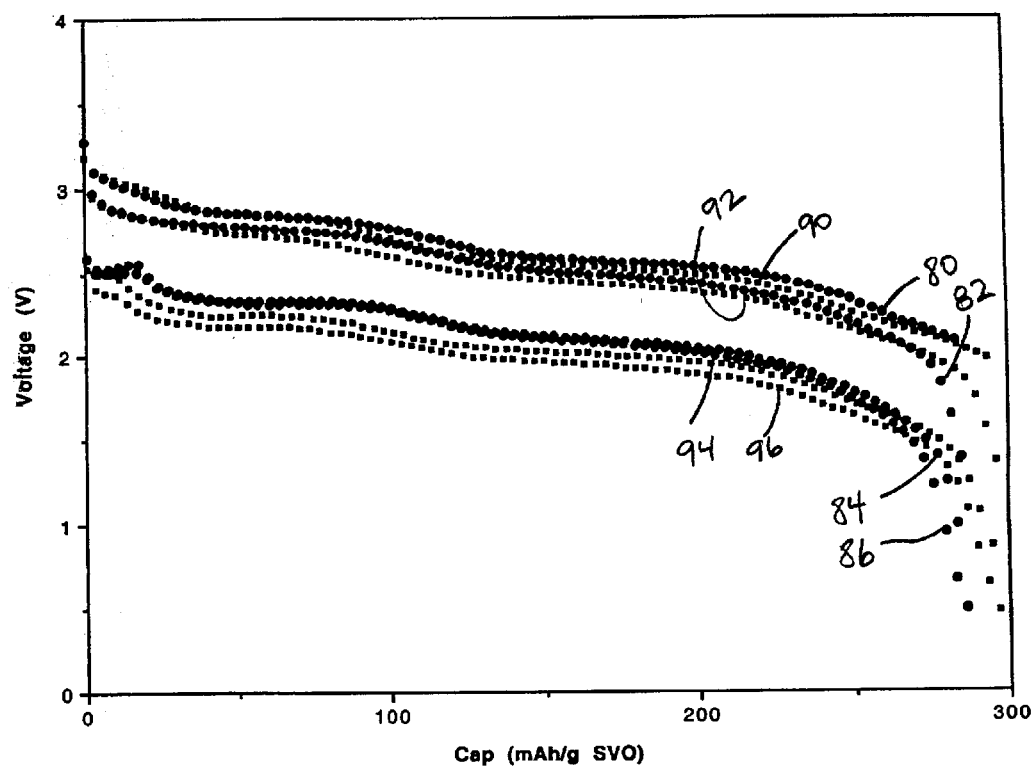
FIG. 8 is a graph constructed from the pulse discharge of a Li/SVO cell according to the prior art in comparison to one according to the present invention.

Test Cells 4 and 5 were discharged in a similar manner as the 300 mA/g SVO pulse discharge regime described above until cell voltage reached 1.0 V. The pulse discharge results are presented in the graphs of FIG. 8. For Test Cell 4, curve 80 is the prepulse voltage before pulse 1, curve 82 is the prepulse voltage before pulse 4, curve 84 is the pulse 1 minima voltage and curve 86 is the pulse 4 minima voltage. Similarly, curves 90, 92, 94 and 96 are those for the discharge of Test Cell 5. As shown by the graphs, Test Cell 5 assembled with a cathode having SVO synthesized under the carbon dioxide/air mixture had a lower dc resistance than that of Test Cell 4 containing SVO synthesized in an ambient air atmosphere.

EXAMPLE 6

An SVO material was prepared in an identical manner as set forth in Example 4.

EXAMPLE 7

An SVO material was prepared in an identical manner as set forth in Example 5.

EXAMPLE 8

An SVO material was prepared in an identical manner as set forth in Example 5 except the furnace contained a flow of carbon dioxide and air of about 84% $CO_2$/16% air.

Test Cells 6 to 8 and Testing

Test Cells 6 to 8 containing the respective SVO materials of Examples 6 to 8 were assembled in an identical manner as Test Cells 1 to 3 described above.

Test Cells 6 to 8 were then discharged using a series of four 400 mA/g SVO pulses for a duration of 10 seconds. The cells were rested at open circuit voltage for 30 minutes after each pulse train of four pulses, the pulses being separated from each other by 15 seconds. This pulsing protocol was repeated until cell voltage reached 1.0 V.

Figure 9:
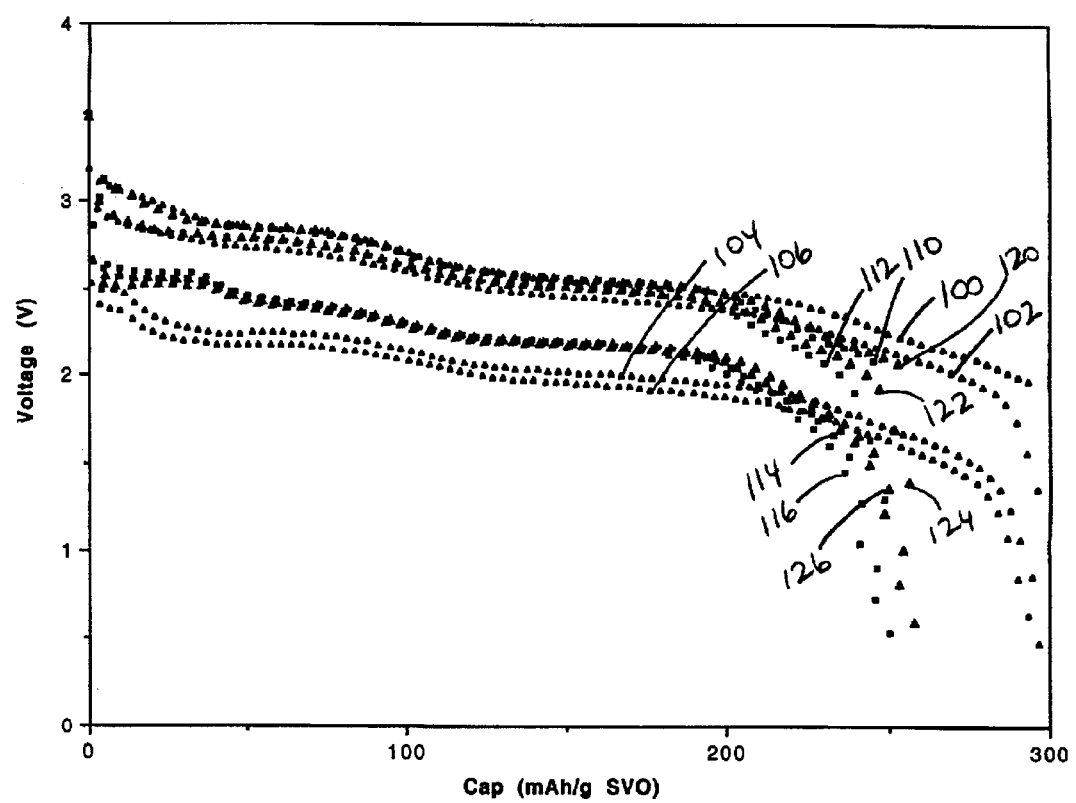
FIG. 9 is a graph constructed from the pulse discharge of a Li/SVO cell according to the prior art in comparison to two constructed according to the present invention with the SVO having been synthesized under various reduced oxygen atmospheres.

The pulse discharge results are presented in the graph of FIG. 9. For Test Cell 6, curve 100 is the prepulse voltage before pulse 1, curve 102 is the prepulse voltage before pulse 4, curve 104 is the pulse 1 minima voltage and curve 106 is the pulse 4 minima voltage. Similarly, curves 110, 112, 114 and 116 are those for the discharge of Test Cell 7, and curves 120, 122, 124 and 126 are those for the discharge of Test Cell 8.

As shown in FIG. 9, Test Cells 7 and 8 assembled with cathodes having SVO synthesized under the respective carbon dioxide/air mixtures again showed a lower dc resistance than that of Test Cell 6 containing SVO synthesized in an ambient air atmosphere.

EXAMPLE 9

An SVO material was prepared in an identical manner as set forth in Example 4.

EXAMPLES 10 AND 11

An SVO material was prepared in an identical manner as set forth in Example 3.

Test Cells 9 to 11 and Testing

Test Cells 9 to 11 containing the respective SVO materials of Examples 9 to 11 were assembled in an identical manner as Test Cells 1 to 3 described above.

Figure 10:
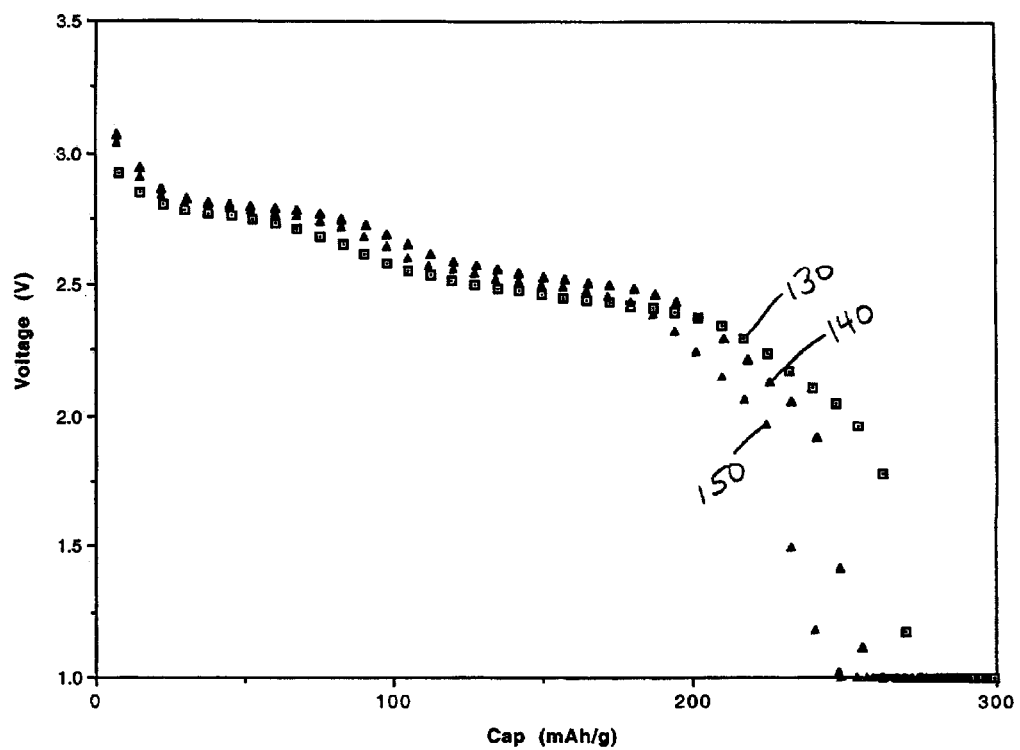
FIG. 10 is a graph constructed from the constant current discharge of a Li/SVO cell according to the prior art in comparison to two constructed according to the present invention with the SVO having been synthesized in a rotating furnace having a reduced oxygen atmosphere.

Test Cells 9 to 11 were then discharged at a constant current of 0.5 mA (current density=30 mA/g of SVO) to a voltage of 1.0 V. The discharge results are presented in the graph of FIG. 10 where curves 130, 140, and 150 are of respective Test Cells 9 to 11.

Test Cells 9 to 11 containing cathodes synthesized using the reaction chamber (FIG. 1) had a slightly lower amount of capacity. This along with cathodes made with SVO synthesized under carbon dioxide/air atmosphere suggests a product with higher crystallinity Samples of SVO prepared by heating a silver-containing compound with a vanadium-containing compound in a $CO_2$/air-oxygen atmosphere showed larger peak intensity in x-ray diffraction analysis when compared to SVO prepared from the same starting materials and synthesized in ambient air. Typically, larger peak intensities indicate a higher percentage of crystallinity for powdered active materials This means that the crystals of the present active material are larger and more ordered than those of the prior art techniques.

It is appreciated that various modifications to the inventive concepts described herein may be apparent to those of ordinary skill in the art without departing from the spirit and scope of the present invention as defined by the appended claims.

What is claimed is:

1. A cathode for an electrochemical cell, the cathode comprising a cathode active material characterized as having been prepared by heating a reaction mixture of a silver-containing compound mixed with an vanadium-containing compound in an atmosphere containing oxygen, but at a reduced concentration with respect to an ambient atmosphere to provide the cathode active material comprising γ-phase silver vanadium oxide ($Ag_{0.8}V_2O_{5.4}$), ε-phase silver vanadium oxide ($Ag_2V_4O_{11}$) and elemental silver.

2. The cathode of claim 1 wherein the silver-containing compound is selected from the group consisting of silver nitrate, silver lactate, silver triflate, silver pentafluoropropionate, silver laurate, silver myristate, silver palmitate, silver stearate, silver vanadate, silver oxide, silver carbonate, and mixtures thereof.

3. The cathode of claim 1 wherein the vanadium-containing compound is selected from the group consisting of $NH_4VO_3$, $AgVO_2$, $V_2O_5$, $V_2O_4$, $V_6O_{13}$, $V_2O_3$, and mixtures thereof.

4. The cathode of claim 1 wherein the reduced oxygen atmosphere has an oxygen content of about 1% to about 10%.

5. The cathode of claim 1 wherein the cathode active material comprises about 30% to about 70% γ-phase silver vanadium oxide, about 30% to about 70% ε-phase silver vanadium oxide and about 1% to about 15% silver metal.

6. The cathode of claim 1 wherein the reaction mixture is heated to at least one reaction temperature in a range from about 200° C. to about 550° C.

7. The cathode of claim 1 wherein the reaction mixture is heated to at least one reaction temperature for about 30 minutes to about 30 hours.

8. The cathode of claim 1 further comprising a binder and a conductive material.

9. The cathode of claim 1 wherein the reduced oxygen atmosphere contains carbon dioxide.

10. A nonaqueous electrochemical cell, comprising:

a) an anode;

b) a cathode comprising a cathode active material characterized as having been prepared by heating a reaction mixture of a silver-containing compound mixed with a vanadium-containing compound in an atmosphere containing oxygen, but at a reduced concentration with respect to an ambient atmosphere to provide the electrode active material comprising γ-phase silver vanadium oxide ($Ag_{0.8}V_2O_{5.4}$), ε-phase silver vanadium oxide ($Ag^2V_4O_{11}$) and elemental silver;

c) a separator material electrically insulating the anode from the cathode; and d) a nonaqueous electrolyte activating the anode and the cathode.

11. The electrochemical cell of claim 10 wherein the anode is comprised of lithium.

12. The electrochemical cell of claim 10 wherein the silver-containing compound is selected from the group consisting of silver nitrate, silver lactate, silver triflate, silver pentafluoropropionate, silver laurate, silver myristate, silver palmitate, silver stearate, silver vanadate, silver oxide, silver carbonate, and mixtures thereof.

13. The electrochemical cell of claim 10 wherein the vanadium-containing compound is selected from the group consisting of $NH_4VO_3$, $AgVO_2$, $V_2O_5$, $V_2O_4$, $V_6O_{13}$, $V_2O_3$, and mixtures thereof.

14. The electrochemical cell of claim 10 wherein the reduced oxygen atmosphere is characterized as having had an oxygen content of about 1% to about 10%.

15. The electrochemical cell of claim 10 wherein the cathode active material comprises about 30% to about 70% γ-phase silver vanadium oxide, about 30% to about 70% ε-phase silver vanadium oxide and about 1% to about 15% silver metal.

16. The electrochemical cell of claim 10 wherein the reaction mixture is characterized as having been heated to at least one reaction temperature in a range from about 200° C. to about 550° C.

17. The electrochemical cell of claim 10 wherein the reaction mixture is characterized as having been heated to at least one reaction temperature for about 30 minutes to about 30 hours.

18. The electrochemical cell of claim 10 wherein the reduced oxygen atmosphere contains carbon dioxide.

* * * * *

UNITED STATES PATENT AND TRADEMARK OFFICE
CERTIFICATE OF CORRECTION

PATENT NO.     : 6,803,147 B2
DATED           : October 12, 2004
INVENTOR(S)  : Esther Takeuchi et al.

It is certified that error appears in the above-identified patent and that said Letters Patent is hereby corrected as shown below:

Column 10,
Line 35, "an vanadium-containing" should read -- a vanadium-containing --; and Column 11,
Line 11, "$(Ag^2V_4O_{11})$" should read -- $(Ag_2V_4O_{11})$ --.

Signed and Sealed this

Ninth Day of August, 2005

JON W. DUDAS
*Director of the United States Patent and Trademark Office*